US008014572B2

(12) United States Patent
Xiao et al.

(10) Patent No.: US 8,014,572 B2
(45) Date of Patent: Sep. 6, 2011

(54) FACE ANNOTATION FRAMEWORK WITH PARTIAL CLUSTERING AND INTERACTIVE LABELING

(75) Inventors: Rong Xiao, Beijing (CN); Fang Wen, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 998 days.

(21) Appl. No.: 11/760,641

(22) Filed: Jun. 8, 2007

(65) Prior Publication Data

US 2008/0304755 A1    Dec. 11, 2008

(51) Int. Cl.
*G06K 9/00*    (2006.01)
(52) U.S. Cl. .......................... 382/118; 382/225; 382/305
(58) Field of Classification Search .................... 382/118
See application file for complete search history.

(56) References Cited

U.S. PATENT DOCUMENTS

| | | | |
|---|---|---|---|
| 5,940,049 A | 8/1999 | Hinman et al. | |
| 6,327,048 B1 | 12/2001 | Wen | |
| 6,678,389 B1 | 1/2004 | Sun et al. | |
| 6,819,797 B1 | 11/2004 | Smith et al. | |
| 6,847,731 B1 * | 1/2005 | Caulfield | 382/159 |
| 7,103,214 B2 * | 9/2006 | Kusakabe et al. | 382/162 |
| 7,103,225 B2 | 9/2006 | Yang et al. | |
| 7,119,814 B2 | 10/2006 | Meron et al. | |
| 7,130,454 B1 | 10/2006 | Berube et al. | |
| 7,146,349 B2 | 12/2006 | Benitez-Jimenez et al. | |
| 7,162,085 B2 * | 1/2007 | Kato et al. | 382/181 |
| 7,177,463 B2 * | 2/2007 | Kusakabe et al. | 382/162 |
| 7,203,346 B2 | 4/2007 | Kim et al. | |
| 2002/0159642 A1 * | 10/2002 | Whitney | 382/225 |
| 2003/0048950 A1 * | 3/2003 | Savakis et al. | 382/225 |
| 2003/0059107 A1 * | 3/2003 | Sun et al. | 382/165 |
| 2003/0147558 A1 * | 8/2003 | Loui et al. | 382/225 |
| 2004/0001621 A1 * | 1/2004 | Kusakabe et al. | 382/164 |
| 2004/0064455 A1 | 4/2004 | Rosenzweig et al. | |
| 2004/0264780 A1 * | 12/2004 | Zhang et al. | 382/224 |
| 2006/0061595 A1 | 3/2006 | Goede et al. | |
| 2006/0239515 A1 * | 10/2006 | Zhang et al. | 382/118 |
| 2008/0304755 A1 * | 12/2008 | Xiao et al. | 382/225 |

FOREIGN PATENT DOCUMENTS

WO    WO0016243 A1    3/2000

OTHER PUBLICATIONS

Ma, et al., "An Indexing and Browsing System for Home Video", available at least as early as Feb. 27, 2007, at <<http://www.eurasip.org/content/Eusipco/2000/sessions/TueAm/SS3/cr1924.pdf>>, pp. 1-4.

(Continued)

*Primary Examiner* — Sath V Perungavoor
(74) *Attorney, Agent, or Firm* — Lee & Hayes, PLLC (57) ABSTRACT

Systems and methods are described for a face annotation framework with partial clustering and interactive labeling. In one implementation, an exemplary system automatically groups some images of a collection of images into clusters, each cluster mainly including images that contain a person's face associated with that cluster. After an initial user-labeling of each cluster with the person's name or other label, in which the user may also delete/label images that do not belong in the cluster, the system iteratively proposes subsequent clusters for the user to label, proposing clusters of images that when labeled, produce a maximum information gain at each iteration and minimize the total number of user interactions for labeling the entire collection of images.

20 Claims, 7 Drawing Sheets

OTHER PUBLICATIONS

Naaman, et al., "Leveraging Context to Resolve Identity in Photo Albums", available at least as early as Feb. 27, 2007, at <<http://delivery.acm.org/10.1145/1070000/1065430/p178-naaman.pdf?key1=1065430&key2=7517552711&coll=GUIDE&dl=GUIDE&CFID=12221941&CFTOKEN=96403394>>, ACM, 2005, pp. 178-187.

Suh, et al., "Image Management Using Pattern Recognition Systems", available at least as early as Feb. 27, 2007, at <<https://drum.umd.edu/dspace/bitstream/1903/2455/1/umi-umd-2322.pdf>>, pp. 1-190.

Zhang, et al., "Automated Annotation of Human Faces in Family Albums", available at least as early as Feb. 27, 2007, at <<http://citeseer.ist.psu.edu/cache/papers/cs/31376/http:zSzzSzresearch.microsoft.comzSzuserszSzleizhangzSzPaperzSzACMMM03.pdf/zhang03automated.pdf>>, ACM, 2003, pp. 1-4.

* cited by examiner

FACE ANNOTATION FRAMEWORK WITH PARTIAL CLUSTERING AND INTERACTIVE LABELING

BACKGROUND

Digital photo albums are growing explosively in popularity—both number and size-due to the rapid popularization of digital cameras and mobile phone cameras in the last decade. These large image collections often require the annotation of some semantic information to facilitate browsing, manipulation and sharing of photos. In a typical family photo, for example, the information of when and where the photo was taken is helpful, but even more important is the information of who is portrayed in the photo. Therefore, face annotation is becoming an indispensable part of the management of photos and other images depicting people.

Unfortunately, in most conventional commercial systems, face annotation is based on elaborate, user-driven user interface designs. Although some efforts have been made to simplify photo labeling with a drag-and-drop interface, none contain break-through improvements automating the process although some use state-of-art face detection techniques. In each conventional system, relatively intensive operations are required to label and group faces in photos. Labeling each photo by hand according to the faces of the people pictured remains a tedious task. What is needed is an automatic/semi-automatic technique to enable rapid face annotation.

SUMMARY

Systems and methods are described for a face annotation framework with partial clustering and interactive labeling. In one implementation, an exemplary system automatically groups some images of a collection of images into clusters, each cluster mainly including images that contain a person's face associated with that cluster. After an initial user-labeling of each cluster with the person's name or other label, in which the user may also delete/label images that do not belong in the cluster, the system iteratively proposes subsequent clusters for the user to label, proposing clusters of images that when labeled, produce a maximum information gain at each iteration and minimize the total number of user interactions for labeling the entire collection of images.

This summary is provided to introduce the subject matter of a face annotation framework with partial clustering and interactive labeling, which is further described below in the Detailed Description. This summary is not intended to identify essential features of the claimed subject matter, nor is it intended for use in determining the scope of the claimed subject matter.

DETAILED DESCRIPTION

Overview

This disclosure describes systems and methods for face annotation with partial clustering and interactive labeling. Such face annotation is important for photo management systems. Exemplary systems described herein combine unsupervised (automatic) and interactive learning. In the automatic stage, an exemplary partial clustering technique finds highly evident clusters of photos in which the faces match—each cluster contains images of the same person's face, with high confidence—instead of trying to force every photo in the entire collection into a cluster or category. This exemplary partial clustering leads to a reliable initial labeling that facilitates later user interaction.

In the interactive stage, an efficient labeling procedure maximizes face annotation of the remaining unlabeled photos while minimizing user interaction needed to do so, by minimizing both global system uncertainty and estimated number of user operations. The exemplary systems described herein can significantly reduce face annotation workload as compared with conventional techniques. Such systems implement two goals: to yield relatively high performance without user interaction; and when user interaction is included, to reduce the user interaction to as low a level as possible. The exemplary systems provide an interactive way to help users annotate photos semi-automatically, achieve good organization, and achieve high image-search performance.

Exemplary System

Figure 1:
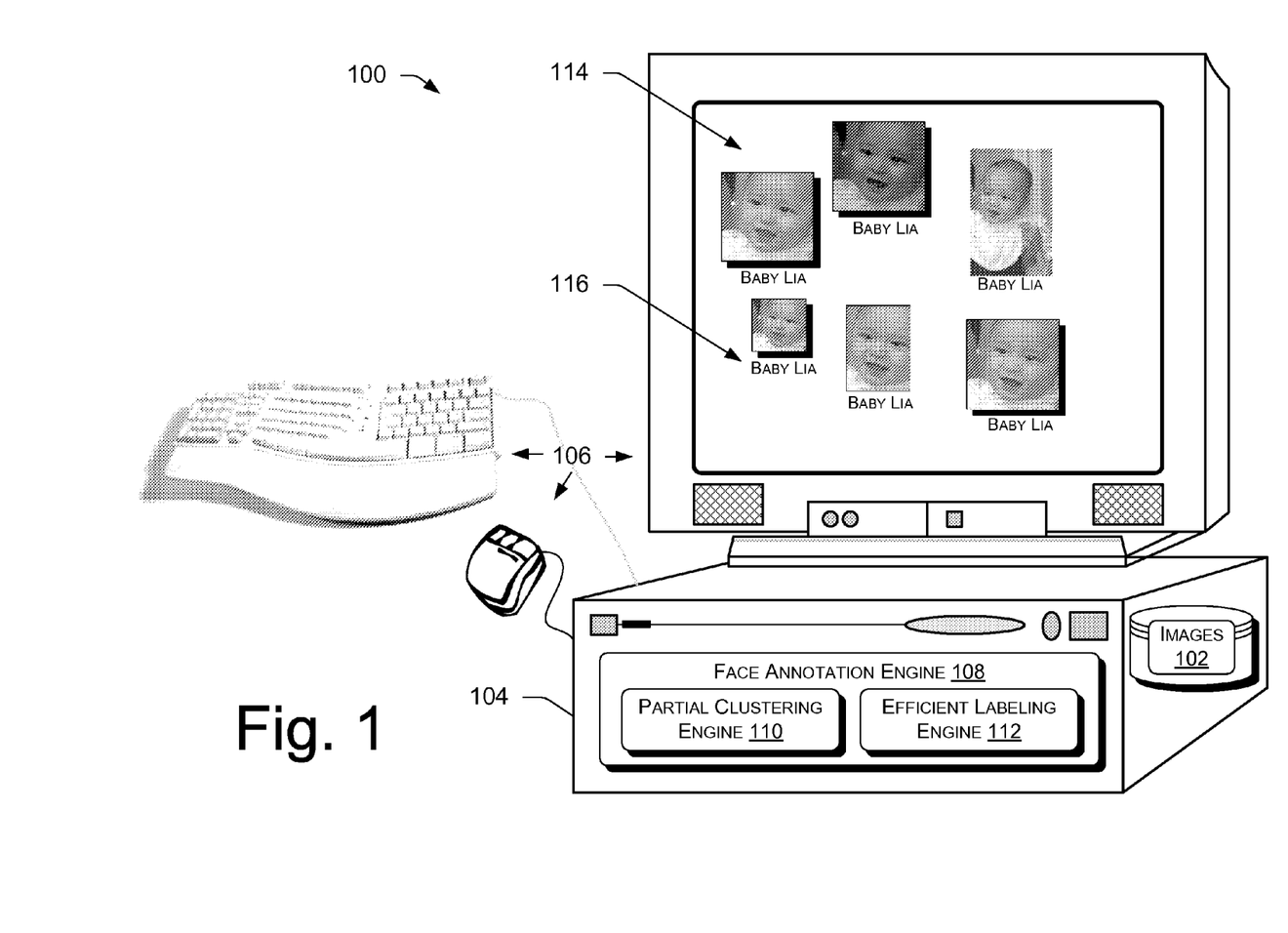
FIG. 1 is a diagram of an exemplary face annotation system.

FIG. 1 shows an exemplary system 100 for semi-automatic face annotation of a collection of images 102. The exemplary system 100 includes a computing device 104 with user interface(s) 106, such as display, keyboard, and mouse. The computing device 104 can be a desktop or notebook computer or any other computing device on which digital images are stored. The computing device104 hosts a face annotation engine 108, which further includes a partial clustering engine 110 and an efficient labeling engine 112. The partial clustering engine 110 accomplishes the automatic stage introduced above, in which some images in the image collection are automatically clustered into groups of the same face/person with high confidence. The efficient labeling engine 112 accomplishes the second iterative stage introduced above, in which automatically proposed clusters allow the remaining images to be annotated by the user with high efficiency and minimal user operations.

Further, FIG. 1 illustrates a result automatically achieved by the partial clustering engine 110. On the display, six different pictures of Baby Lia have been grouped with high confidence into an evident cluster 114 by the partial clustering engine 110 and labeled with the moniker "Baby Lia" 116 in an initial labeling by the user. There may be more images of Baby Lia remaining as unassigned in the general image collection 102. But the aim of the partial clustering engine 110 is not to categorize every image in the collection 102, but rather to determine evident clusters 114 that contain the same face with high reliability. This provides a firm starting point for the efficient labeling engine 112 to finish the clustering and labeling task with a highly efficient minimization of the number of user interactions. So, the clusters (e.g., 114) that are determined by the partial clustering engine 110 are highly purified subsets that reliably contain the face of the same person associated with that cluster.

The partial clustering engine 110 will be described in greater detail with respected to FIG. 3 below, while the efficient labeling engine 112 will be described in greater detail with respect to FIG. 5.

Exemplary Face Annotation—Operational Overview

Figure 2:
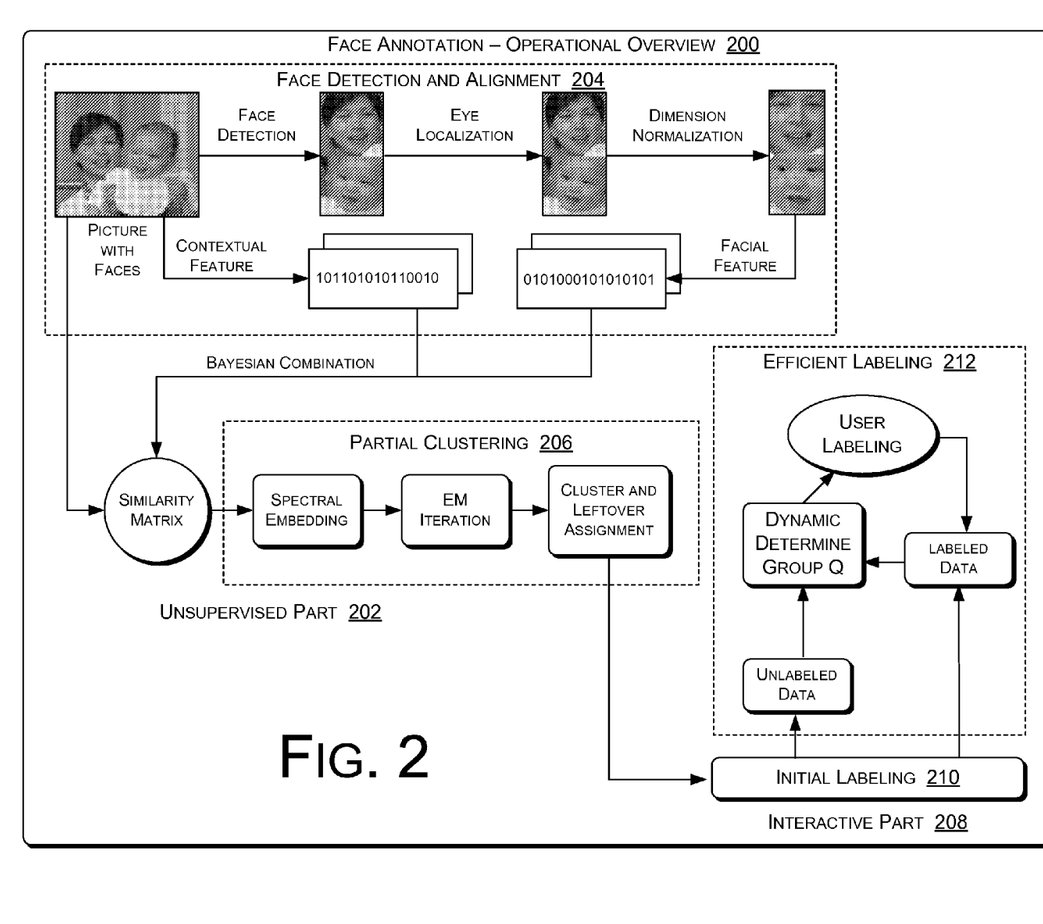
FIG. 2 is a diagram of an operational overview of the exemplary face annotation system.

FIG. 2 shows an operational overview 200 of one implementation of the face annotation engine 108. In this implementation, the fully automatic unsupervised part 202 of the operation consists of face detection and alignment204 and the partial clustering stage 206. The interactive part 208 of the process consists of initial user-labeling 210 and the efficient labeling stage 212.

Overall, the face annotation operation 200 aims at reduction of user labors rather than overall clustering performance. Thus, the unsupervised part 202 has a deliberate bias toward finding evident clusters, so that the user can quickly label these to offer the face annotation operation 200 a large amount of labeled information with very few user efforts. To achieve this goal, the exemplary system100 uses a generative model to formulate these goals, and a naturally defined evidence criterion to eliminate a possible regularization constant.

In the interactive part 208, the efficient labeling process 212 models both global system uncertainty and estimated number of user operations via entropy notation. In each iteration of the process, a particular group of unlabeled faces that most likely belong to one person and the information to most decrease global entropy is popped up for the user's labeling. This reduces the user's workload in the interactive part 208 as much as possible.

Exemplary Engines

Figure 3:
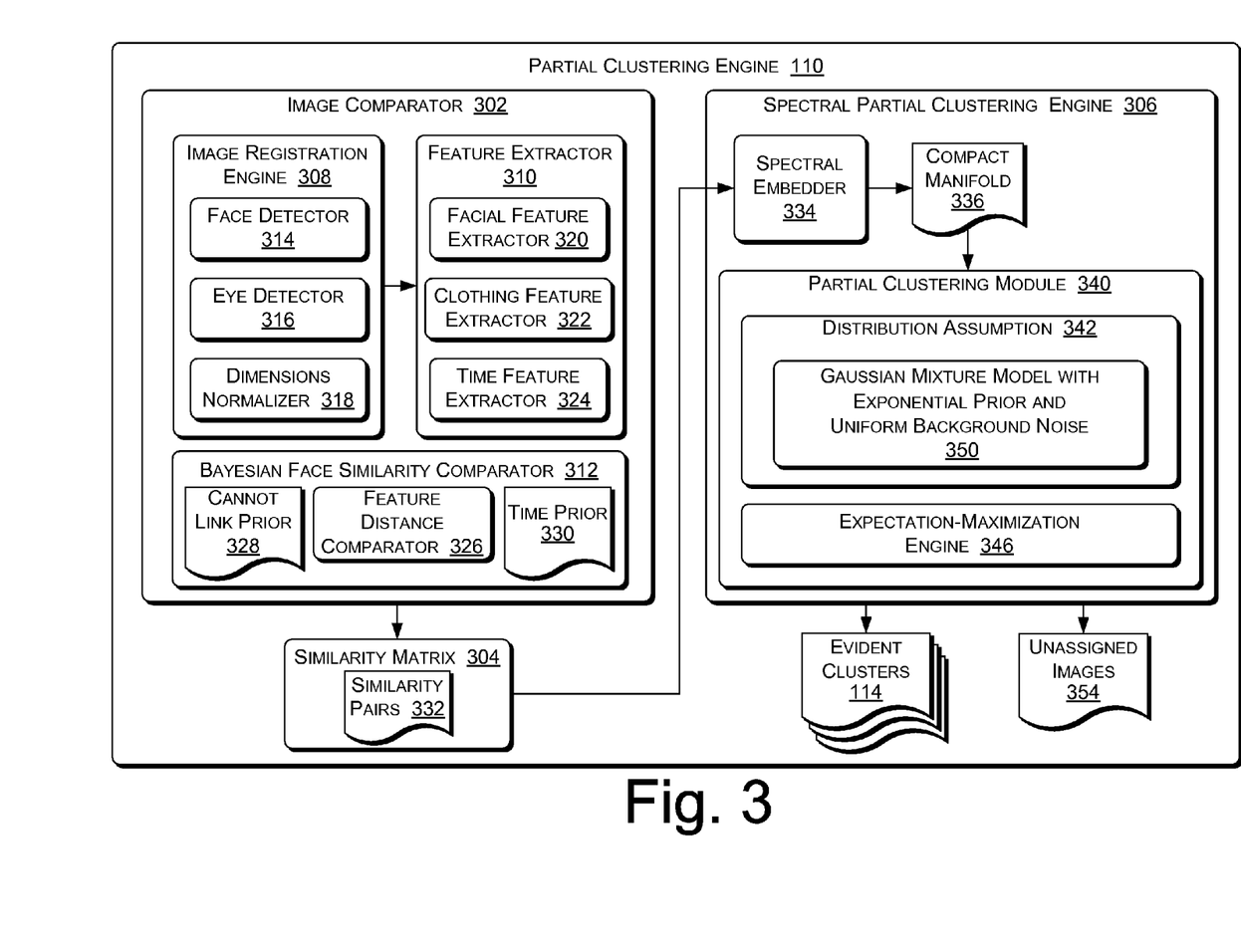
FIG. 3 is a block diagram of an exemplary partial clustering engine.

FIG. 3 shows the partial clustering engine 110 of FIG. 1 in greater detail. In this implementation, the exemplary partial clustering engine 110 embodies the operations of face detection and alignment 204 as well as the operation of partial clustering 206 (FIG. 2). The illustrated implementation is only one example configuration, for descriptive purposes. Many other arrangements of the components of an exemplary partial clustering engine 110 are possible within the scope of the subject matter. Such an exemplary partial clustering engine 110 can be executed in hardware, software, or combinations of hardware, software, firmware, etc.

The illustrated partial clustering engine 110 includes an image comparator 302, a similarity matrix 304, and a spectral partial clustering engine306. The image comparator 302 further includes an image registration engine 308, a feature extractor 310, and a Bayesian face similarity comparator 312. The image registration engine further includes a face detector 314, an eye detector 316, and a dimensions normalizer 318. The feature extractor 310 further includes a facial feature extractor 320, a clothing feature extractor 322, and a temporal or "time" feature extractor 324. The Bayesian face similarity comparator 312 further includes a feature distance comparator 326, which may utilize a "cannot link" prior318 and a time prior 330.

The spectral partial clustering engine 306 further includes a spectral embedder 334, a compact manifold 336, and a partial clustering module 340. The partial clustering module 340 may further utilize a distribution assumption 342, including a Gaussian mixture model with exponential prior and uniform background noise 350, and an expectation-maximization (EM) engine 346.

The spectral partial clustering engine 306 produces one or more evident clusters 114 and a remaining "litter-bin" of leftover or unassigned images354.

Operation of the Exemplary Partial Clustering Engine

As introduced further above, the exemplary partial clustering engine110 does not necessarily expect overall good performance for a self-contained clustering procedure, which is, however, the ultimate goal of most machine learning methods, but instead aims at finding refined initial clusters that reliably contain one person's face, for the user to label with ease, thereby providing an initial large information gain to the exemplary face annotation engine 108.

To achieve this goal, the partial clustering engine 110 tries to bias clustering results so that only images with faces that have a very "evident" match with each other are merged as clusters 114, while other faces in other images, that are not grouped tightly enough, remain in the unassigned images 354. The evident clusters 114 usually contain only one identity, hence the user can perform batch labeling with only one click of the mouse. Then with these evident clusters 114 obtained at relatively inexpensive processing cost, the efficient labeling engine 112 can follow-up with great reduction in the number of subsequent user interactions to label the rest of the unassigned images 354.

The next several paragraphs provide detailed description of an example implementation of the partial clustering engine 110. First, the ways that features are extracted and combined to form similarity are presented, then description of the clustering techniques follows.

Spectral Embedding Using Face Similarity Measures

In a photo album or collection 102, a set of faces $X=\{x_i\}$, $i=1 \ldots N$ is extracted for each individual. For example, the image registration engine 308 can include a face detector 314, an eye detector 316, and a dimensions normalizer 318 to initially register faces in the collection of images 102.

For each face, the facial feature extractor 320 represents the face as $x \in X$, $f(x)$ in facial feature space; the clothing feature extractor 322 represents the face in association with $c(x)$ in clothing feature space; and the time feature extractor 324 represents the face in association with $t(x)$, the time when the photo was taken. For any two faces $x_i$ and $x_j$, the feature extractor 310 defines the following distances: $d_{i,j}^F \equiv d(f(x_i), f(x_j))$ is the distance in the facial feature space, $d_{i,j}^C \equiv d(c(x_i), c(x_j))$ is the distance in the clothing feature space, and $d_{i,j}^T \equiv d(t(x_i), t(x_j))$ is the time or temporal distance. P Using a Bayesian rule, the Bayesian face similarity comparator 312 formulates face similarity as in Equation (1):

$$P(\Omega_I | d^F, d^C, d^T) = \frac{P(d^F, d^C | \Omega_I, d^T) P(\Omega_I | d^T)}{P(d^F, d^C | d^T)}, \quad (1)$$

where $\Omega_I$ represent patches $x_i$ and $x_j$ from photos of the same individual.

Using the assumption of a time prior 330, that the same individual tends to wear the same clothes during a short period of time, the dependence between $d^F$ and $d^C$ derives only from knowledge of this time prior 330. Therefore, as in Equation (2):

$$P(d^F, d^C | \Omega_I, d^T) = P(d^F | \Omega_I, d^T) P(d^C | \Omega_I, d^T) \quad (2)$$

Given $\Omega_I$, $d^F$ is independent of $d^T$, and $\Omega_I$ is independent of $d^T$ resulting in Equations (3) and (4):

$$P(d^F | \Omega_I, d^T) = P(d^F | \Omega_I) \quad (3)$$

$$P(\Omega_I | d^T) = P(\Omega_I). \quad (4)$$

Using Equations (2), (3), and (4), Equation (1) can be rewritten as in Equation (5):

$$P(\Omega_l|d^F, d^C, d^T) = \frac{P(d^F|\Omega_l)P(d^C|\Omega_l, d^T)P(\Omega_l)}{P(d^F|d^T)P(d^C|d^T)} \quad (5)$$

The similarity matrix A 304 stores all derived pair-wise similarities 332, with $a_{ij} = P(\Omega_l|d_{ij}^F, d_{ij}^C, d_{ij}^T)$.

The probabilities $P(d^F|\Omega_l)$, $P(d^C|\Omega_l, d^T)$, $P(\Omega_l)$, $P(d^F|d^T)$, and $P(d^C|d^T)$ can be estimated in a training set using a similar method described in L. Zhang, L. Chen, M. Li, and H. Zhang, "Automated annotation of human faces in family albums," *ACM Multimedia,* 2003, which is incorporated herein by reference.

In addition to the time prior 330, the Bayesian face similarity comparator 312 can also use another prior, called the cannot-link prior 318 to further improve the discriminative power of face similarity detection. The cannot-link prior 328 is derived from the fact that two faces appearing in the same image most likely belong to different persons. In one implementation, this prior 328 is simply modeled as a hard constraint on face similarity.

Exemplary Spectral Partial Clustering Technique

Once pair-wise similarity 332 is defined and stored in the similarity matrix 304, a variety of techniques can be used for automatic clustering. Spectral clustering is one technique that has proved effective and stable. Described below is exemplary spectral partial clustering. The spectral partial clustering procedure consists of two main steps. The first step is spectral embedding, which can utilize conventional spectral clustering methods. The second step is an exemplary partial clustering method based on an exemplary Gaussian mixture model. Different from the conventional Gaussian mixture model, the exemplary Gaussian mixture model contains a uniform background noise distribution, and an exponential prior to control the variances of each component Gaussian distribution. The MAP (Maximum a Posterior) estimation of this model can be solved by an EM (Expectation-Maximization) technique executed by the Expectation-Maximization engine 346.

Thus, an exemplary spectral clustering technique can be decomposed into two parts, spectral embedding and partial clustering. The spectral embedder 334 finds representations $\{\phi_i\}_{i=1...N}$ for faces $\{x_i\}_{i=1...N}$ in a metric-equipped compact manifold C 336 for graph-structured data, where data are much easier to cluster. In one implementation, the compact manifold C 336 is the surface of a d-dimensional unit hypersphere. Then classic K-means is used to cluster the data in the compact manifold C 336.

However, for face annotation, due to difficulties encountered in state-of-the-art face recognition, pair-wise similarity 332 does not work very well even if contextual information is added. In such a situation, after spectral embedding, many faces are mapped into messy data points and simple K-Means produces very noisy results. Hence, in one implementation, the spectral partial clustering engine 306 separates the two parts, and adopts spectral embedding but replaces K-means with exemplary partial clustering so that only "evident" clusters 114 emerge as clusters in this technique.

Keeping spectral embedding but replacing K-means with exemplary partial clustering provides two advantages. First, the partial clustering causes data to be more concentrated in the compact manifold 336; and second, after spectral embedding, all data are settled on the surface of the compact manifold 336 of M-dimensional unit sphere, which leads to a distribution in the compact manifold 336, where the "area" is finite. Accordingly, the Gaussian Mixture Model with exponential prior and uniform background noise 350 imposes a uniform background probability distribution on the manifold 336, and defines in a natural manner what an "evident" cluster is. For those faces that form a clique (high similarity between each other), the distribution assumption 342 determines that they concentrate in a higher density than background density, and "pop up" as clusters; whereas for faces with noisy similarities, they tend to scatter everywhere in the compact manifold 336, appearing to be generated by background distribution.

The partial clustering module 340 models evident clusters 114 as the mixture 350 of Gaussian distribution in (d−1)-dimensional manifold C 336 with a uniform background distribution for noisy data. The variances of component Gaussian distributions are controlled by an exponential prior, as in Equation set (6), $$\sigma_j^2 \sim \text{Exp}(\theta) j = 1 \ldots K$$

$$Y \sim P(Y=j) = \alpha_j j = 0 \ldots K$$

$$\Phi \sim P(\phi|y=j, \sigma_j) = N(\phi; \mu_j, \sigma_j^2) j = 1 \ldots K$$

$$\sim P(\phi|y=0) = p_b, \quad (6)$$

where $\alpha_1$ is the cluster prior, $\mu_j$ is the mean of the cluster, $\sigma_j$ is the variance of the cluster, $p_b$ is the density of the background distribution, $y_i$ is the label of face $x_i$, and $\phi_i$ is the spectral representation of face $x_i$.

The uniform probability density $p_b$ is thus evaluated to be the inverse of finite "area" $S_d(1)$ of compact manifol C 336, as in Equation (7), $$S_d(1) = \frac{2\pi^{d/2}}{\Gamma(d/2)} \quad (7)$$

where $\Gamma(\cdot)$ is the gamma function $$\Gamma(s) = \int_0^\infty x^{s-1} e^{-x} dx.$$

Then the goal becomes to find the MAP (Maximum a Posteriori) estimation of the following posterior likelihood function in Equation (8), $$P(\phi, \sigma|\mu, \alpha) = \sum_y P(\phi, y, \sigma|\mu, \alpha), \quad (8)$$

which the Expectation-Maximization (EM) engine 346 solves.

Exemplary Efficient Labeling Engine

The next part of the description describes exemplary interactive labeling for face annotation, i.e., the interactive part 208 in FIG. 2.

Figure 4:
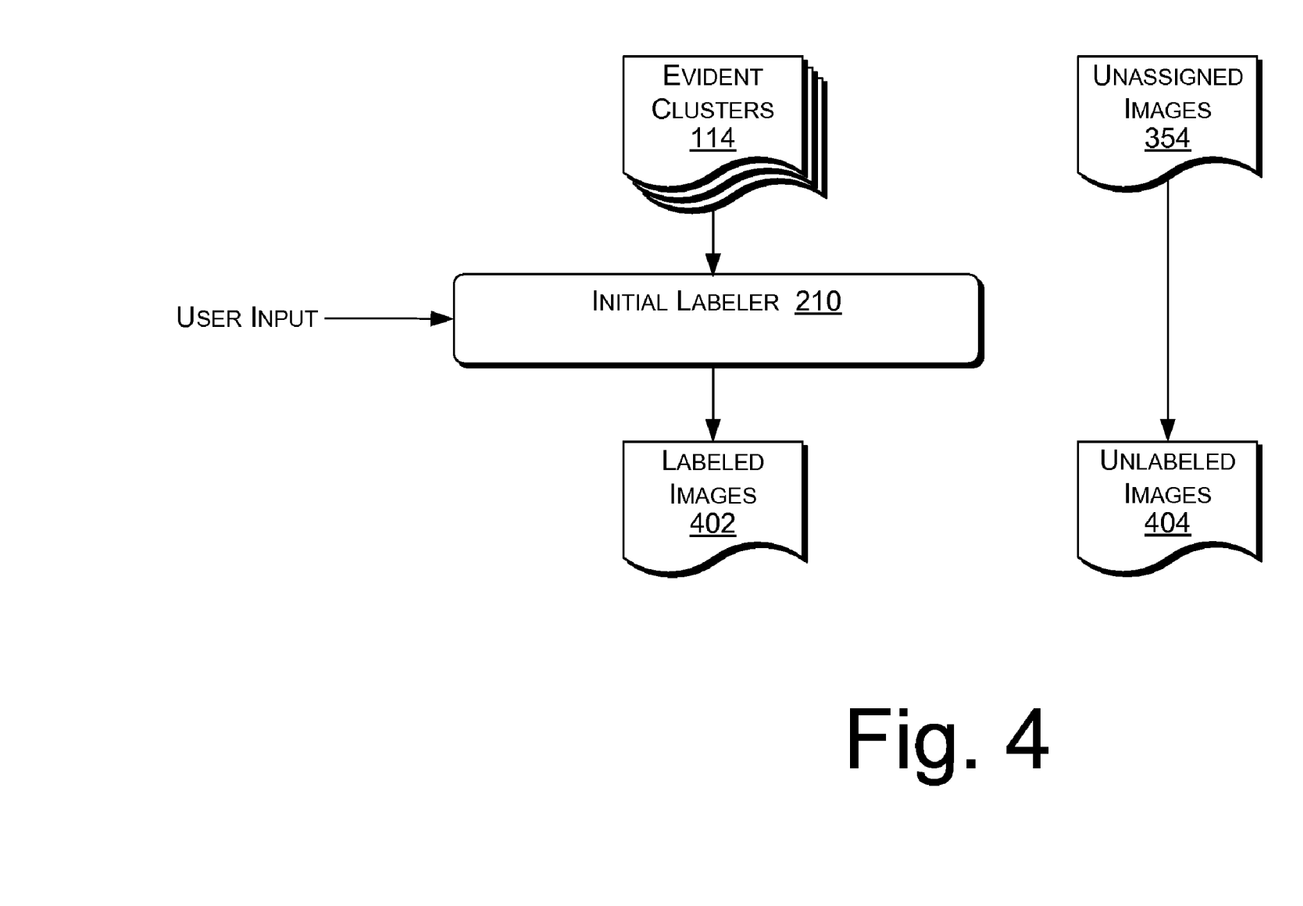
FIG. 4 is a diagram of exemplary initial labeling of clusters produced by the exemplary partial clustering engine of FIG. 3.

After the exemplary partial clustering engine 110 produces evident clusters 114, the not-so-evident faces are gathered as leftover images in the "litter-bin" of unassigned images 354. FIG. 4 shows an initial labeler 210 which applies user interaction via the user interface(s) 106 to label each of the evident clusters 114 found by the partial clustering engine 110. The initial labeler 210 can stand alone or can be included in either the partial clustering engine 110 or the efficient labeling engine 112. With relatively little effort and few actions, the user labels the evident clusters 114, which can then be counted among a body of labeled images 402. For faces on images in the litter-bin of unassigned images 354, it would be annoying and inefficient for the user to label these images one-by-one. The unassigned images 354 (unassigned to a cluster associated with an individual's face) are also considered unlabeled images 404, as distinguished from the labeled images 402.

A simple-minded but undesirable way to solve the problem of labeling unassigned images 354 is to pop up several random selected faces at a time until the user labels the entire collection. This would provide a large information gain via an intensive one-time labeling session, since labels of all faces would then be known. But this costs too many user operations in one step, and would defeat the purpose of semi-automatic face annotation.

Figure 5:
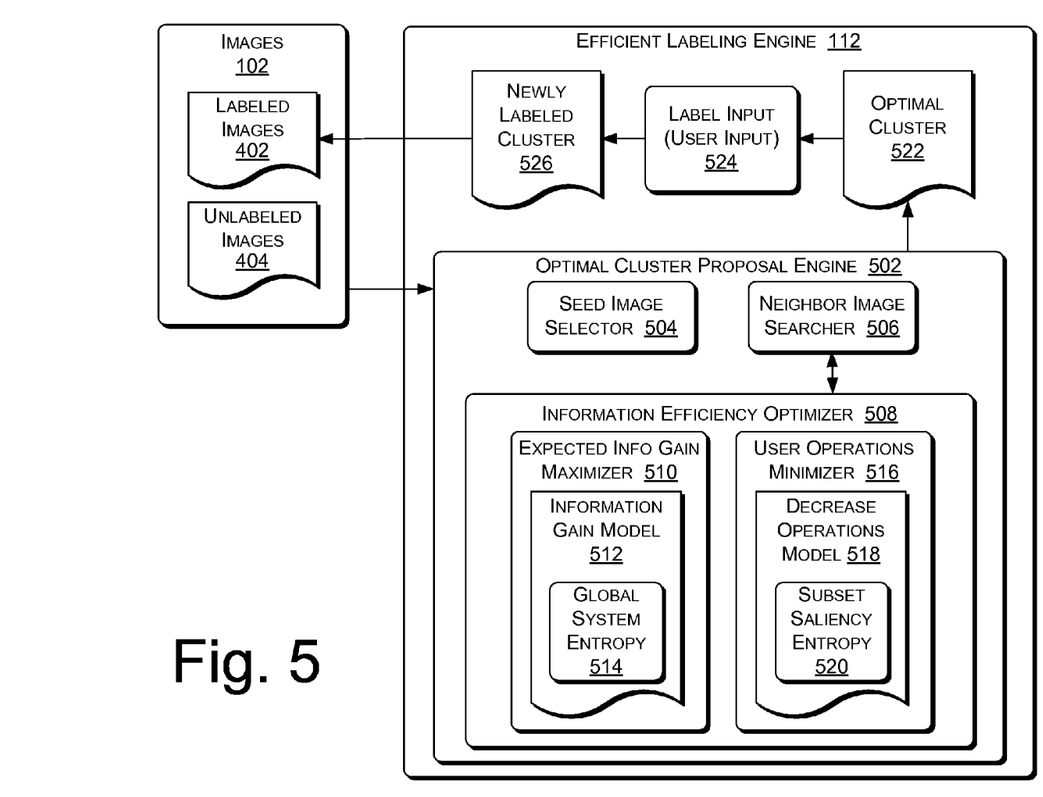
FIG. 5 is a block diagram of an exemplary efficient labeling engine.

FIG. 5 shows an example implementation of the efficient labeling engine 112. In this implementation, the exemplary efficient labeling engine 112 embodies parts of the operation of interactive labeling 208 (FIG. 2). The illustrated implementation is only one example configuration, for descriptive purposes. Many other arrangements of the components of an exemplary efficient labeling engine112 are possible within the scope of the subject matter. Such an exemplary efficient labeling engine 112 can be executed in hardware, software, or combinations of hardware, software, firmware, etc.

In the illustrated configuration, the efficient labeling engine 112 includes, firstly, an optimal cluster proposal engine 502. The optimal cluster proposal engine 502 includes in turn, a seed image selector 504, a neighbor image searcher 506, and an information efficiency optimizer 508. The information efficiency optimizer 508, in turn, includes an expected information gain maximizer510, including an information gain model 512 based on global system entropy 514. The information efficiency optimizer 508 also includes a user operations minimizer 516, including a decrease operations model 518 (a model of operations modeled for the purpose of decreasing the number of operations) based on subset-saliency entropy 520.

The optimal cluster proposal engine 502 is iterative, and proposes the optimal clusters 522. Each optimal cluster 522 can then be labeled by the user via a user input 524 and becomes a newly labeled cluster 526. The newly labeled cluster, in turn, becomes part of the labeled images 402, while the body of unlabeled images 404 undergoes a loss of the individual images from which the optimal cluster 522 was fashioned. In other words, as the efficient labeling engine112 iterates, the labeled images 402 increase while the unlabeled images 404 decrease.

The optimal cluster 522 may sometimes not be optimal. If the optimal cluster includes images that lack the common face, then the user can apply conventional editing and selection techniques through the user interface(s) 106 to edit the cluster and label only those images with the face that characterizes the cluster. The most important property of the efficient labeling engine 112 is not that a perfect optimal cluster 522 is proposed with each iteration, but rather that the information that the user does input is automatically amplified so that not only the maximum labeling occurs but—importantly—the input information helps to design the next proposed optimal cluster 522 in such manner as to prompt the user for the particular information that would be most useful for maximizing the labeling of faces with the minimum number of user interactions. In other words, in one implementation, the optimal cluster proposal engine 502 proactively seeks the most useful information through the optimal clusters 522 it proposes. The most useful information is that which maximizes face annotation of the unlabeled images 404 while minimizing user interactions. Thus, in one sense, the information efficiency optimizer 508 models the face annotation of the remaining unlabeled images 404 as a logical puzzle to be solved with the fewest number of clues provided by the user.

Operation of the Exemplary Efficient Labeling Engine

Interactive Labeling for Face Annotation

The partial clustering engine 110 automatically groups similar faces into several evident clusters 114, and groups dissimilar faces into a background cluster with unassigned images 354. After the partial clustering stage, an "initial labeling" procedure 210 annotates these evident clusters 114. Since faces in an evident cluster 114 most likely belong to a single individual, user annotation interactions on these clusters can be significantly reduced. However, the workload of face annotation to be accomplished in the background cluster of unassigned images 354 is still very significant.

In one implementation, the exemplary parameter-free, iterative efficient labeling engine 112 address the problem of the remaining unlabeled images 404. In each step, the engine 112 uses information from the labeled faces402 to automatically infer an optimal subset of unlabeled faces 404 for user annotation. This annotation step is iteratively applied until all faces are labeled. Using this strategy, the overall user interactions can be reduced by finding an optimal subset of unlabeled faces 404 in each annotation step.

Suppose there are K labeled groups 402 of identities $\mathcal{G}=\{G_1,\ldots,G_K\}$, with $G_j=\{x_i|y_i=j\}$ for $j=1,\ldots,K$, and an unlabeled face set $G_0$ 404, which define the beginning state $s_0=\{G_0,\mathcal{G}\}$. With each iteration, the optimal cluster proposal engine 502 selects a subset $Q \subset G_0$, a proposed optimal cluster 522, to be labeled by the user 524, and then goes to the next state $s'=\{G_0 \backslash Q, \mathcal{G}+Q\}$ as in Equation (9):

$$\mathcal{G} + Q \equiv \bigcup_j \left( G_j + \bigcup_{x_k \in Q, y_k = j} \{x_k\} \right). \quad (9)$$

The transition weight between two states is defined as the "information efficiency," that is, the ratio r of expected information gain to estimated user operations in labeling Q, the proposed optimal cluster 522, as shown in Equation (10):

$$r \equiv \frac{E_{\mathcal{G}}\,[\text{Gain}(Q;\mathcal{G})]}{\text{Operations}(Q)}. \quad (10)$$

The information efficiency optimizer 508 thus aims to search for a path $P \equiv \{Q_1,\ldots,Q_m\}$ from $s_0$ to the common final state $s_F = \{\emptyset, \mathcal{G}_{F}\}$ that maximizes the sum of weights over transitions as in the following Equation (11):

$$\max_P \sum_{k=1}^m r_k, \quad (11)$$

and $r_k$ is defined as in Equation (12):

$$r_k = \frac{E_{\mathcal{G}_k}[\text{Gain}(Q; \mathcal{G}_k)]}{\text{Operations}(Q_k)}, \qquad (12)$$

$$\text{with } \mathcal{G}_k \equiv \mathcal{G} + \bigcup_{j=1}^{k-1} Q_j.$$

To solve this problem, all the possibilities to find the optimal solution would have to be enumerated, resulting in an NP-hard problem. So in one implementation, the information efficiency optimizer 508 resorts to a greedy approach. In each iteration, the optimal cluster proposal engine 502 finds an optimal set of unlabeled faces $Q \subseteq G_0$ 522 that maximizes the ratio r, as in Equation (13):

$$Q = \arg\max_Q \frac{E_{\mathcal{G}}[\text{Gain}(Q; \mathcal{G})]}{\text{Operations}(Q)}. \qquad (13)$$

In the following descriptions, Gain(Q; $\mathcal{G}$) is modeled as the decrement of global entropy of the system 514 conditioned on $\mathcal{G}$, and Operations(Q) as subset-saliency entropy (SSE) 520, which satisfactorily represents the estimated number of user operations.

Information Gain

For $x_i \in G_0$, assume that its label $y_i$ has a probability distribution conditioned on $\mathcal{G}$, as in Equation (14):

$$P(y_i = j | \mathcal{G}) \propto \max_{x_k \in \mathcal{G}_j} a_{ik}. \qquad (14)$$

$a_{ij}$ is the similarity measure between face i and face j. In one implementation, the expected information gain maximizer 510 uses the most similar criterion instead of average. Since the face distribution in the feature space is well-known on a high dimensional manifold, using the similarity between the nearest-neighbor 506 is more robust than using the average of similarities over all relevant samples.

The total uncertainty of all unlabeled faces in $G_0$ 404 can be measured by entropy. Assuming that $G_0$ 404 is an independent random variables set, its global (pseudo-) entropy is simply the addition of each independent part $x_i$, as in Equation (15):

$$H(G_0 | \mathcal{G}) = \sum_{x_i \in G_0} H(x_i | \mathcal{G}), \qquad (15)$$

with each part $H(x_i | \mathcal{G})$ defined on the probability measure of Equation (14).

Suppose the proposed cluster subset $Q \subseteq G_0$ 522 is manually labeled, then the information gain can be defined as the decrement of $H(G_0 | \mathcal{G})$, as in Equation (16):

$$\text{Gain}(Q; \mathcal{G}) = -\Delta H(Q | \mathcal{G}) = H(G_0 | \mathcal{G}) - H(G_0 \setminus Q | \mathcal{G} + Q) \qquad (16)$$

In general, Gain(Q; $\mathcal{Q}$) is not accessible since the true labels of proposed optimal cluster Q 522 are unknown at the outset. But the expectation of Gain(Q; $\mathcal{Q}$) 510 can instead be evaluated, conditioned on Equation (14), as in Equation (17) below:

$$E_{\mathcal{G}}(\text{Gain}(Q; \mathcal{G})) = \sum_{l_Q \in L_Q} \text{Gain}(l_Q; \mathcal{G}) P(l_Q; \mathcal{G}), \qquad (17)$$

where $l_Q$ is a label assignment of the optimal cluster subset Q 522, and $L_Q$ is the set of all possible label assignments. By independent assumption of unlabeled faces $G_0$ 404, the expected information gain maximizer 510 can then actually evaluate the expectation of gain.

Subset-Saliency Entropy

Given proposed optimal cluster subset $Q \subseteq G_0$ 522, the information efficiency optimizer 508 can estimate the number of user operations via Subset-Saliency Entropy H(Q) 520, as in Equation (18):

$$H(Q) = -\sum_{l_Q \in L_Q} P(l_Q) \log P(l_Q), \qquad (18)$$

with $P(l_Q)$ evaluated by the following Equation (19):

$$P(l_Q) = \sum_{l_{G \setminus Q} \in L_{G \setminus Q}} P(l_Q | l_{G \setminus Q}) P(l_{G \setminus Q}), \qquad (19)$$

where $G = \{x_i\}_{i=1 \ldots N}$ is the set of all faces.

This subset-saliency entropy 520 actually models a competition between $Q$ itself and $G \setminus Q$, hence its name. As in Equation (19), if $P(l_Q | l_{G \setminus Q})$ stays nearly constant when $l_{G \setminus Q}$ changes, then $l_Q$ appears highly correlated and cohesive, which makes subset-saliency entropy H(Q) 520 small. In short, members of the proposed cluster Q 522 are expected to share the same label. If $P(l_Q | l_{G \setminus Q})$ changes rapidly with $l_{G \setminus Q}$ then the proposed cluster Q 522 is heavily influenced by faces outside itself, which tends to make proposed cluster Q 522 an independent set. In such a situation, intensive user operations are unavoidable to label the proposed cluster Q 522, as its membership includes images of more than one person.

Exemplary Technique to Solve for Subset-Saliency Entropy

In general, directly computing subset-saliency entropy 520 H(Q) is NP-hard. Additionally, even optimizing Equation (13) instead of Equation (11) is intractable. Therefore, in one implementation the optimal cluster proposal engine 502 adopts a greedy approach that solves both. The greedy approach also yields a plausible and efficient way of computing subset-saliency entropy H(Q) 520.

Figure 6:
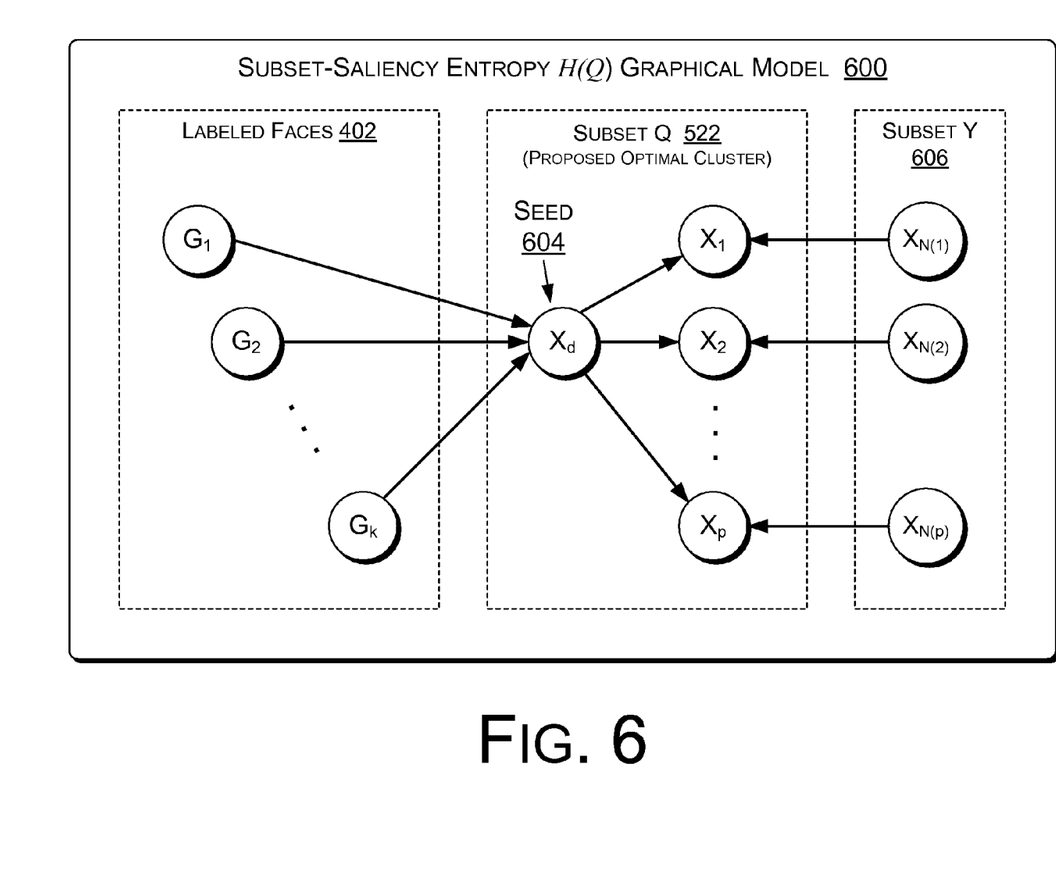
FIG. 6 is a diagram of an exemplary graphical model for subset-saliency entropy used in the exemplary face annotation engine.

FIG. 6 shows a graphical model 600 for solving subset-saliency entropy 520. For proposed optimal cluster subset Q 522, let $Q = \{x_d, x_1, \ldots x_p\}$, as shown. Then the loopy structure in Equation (19) substantially simplifies into a tree structure.

The seed image selector 504 selects one unlabeled face $x_d$ 604 from the unlabeled images 404 as the seed 604 of subset Q 522, and then the neighbor image searcher 506 does a local search over its neighboring images, each time searching for $$x_i = \arg\max_{x_i \in G_0 \setminus Q} a_{id},$$

and applies it into subset Q 522, until Equation (13) begins to decrease.

In this simplified tree model 600, let subset Y 606 (where Y ⊂ G_\Q) hold competitors. Y can be any subset of the unlabeled images 404. Typically the information efficiency optimizer 508 selects two cases, Y=G_0\Q and Y=∪ 𝒢, which correspond to pure unsupervised and pure supervised versions. However, any mixture version is allowed. An unsupervised version is adopted here for the sake of description.

For each $x_i \in \mathcal{Q} \setminus \{x_d\}$, the information efficiency optimizer 508 selects $x_{N(i)}$ from subset Y 606 via the most similar criterion, as in Equation (20):

$$x_{N(i)} = \arg\max_{x_k \in Y} a_{ik}, \quad (20)$$

and then defines conditional probability in FIG. 6 as in Equation (21):

$$P(y_i | y_d, y_{N(i)}) \propto \begin{cases} a_{i,N(i)} & y_i = y_{N(i)} \\ a_{id} & y_i = y_d \\ 0 & \text{otherwise.} \end{cases} \quad (21)$$

For $P(y_{N(i)})$ if $x_{N(i)}$ is labeled, then it is a delta function peaked at $y_{N(i)}$, otherwise the information efficiency optimizer 508 assigns a uniform probability over K possible labels. This is because in an unsupervised version, the subset-saliency entropy H(Q) 520 should truly reflect the saliency structure of subset 𝒬522 in the set of unlabeled faces G_0 404, without any bias on labeled data 402. But the supervised version is equally reasonable.

Then for each $x_i$, by marginalization over $x_{N(i)}$, Equation (22) is obtained:

$$P(y_i | y_d) = \sum_{y_{N(i)}} P(y_i | y_d, y_{N(i)}) P(y_{N(i)}). \quad (22)$$

And the subset-saliency entropy H(Q) 520 is thus evaluated as in Equation (23):

$$H(Q) = H(y_d) + H(Q \setminus \{y_d\} | y_d) = H(y_d) + \sum_i H(y_i | y_d). \quad (23)$$

In essence, in the extreme case of strong intra-connection and weak interconnection of the proposed optimal cluster Q 522, the subset-saliency entropy H(Q) 520 will be exactly $H(y_d) \approx \log K$, which indicates only one operation is needed; whereas in the other extreme case, all $y_i$ are mutually independent no matter whether $y_d$ is given, which results in $H(y_d) + p \log K \approx (p+1) \log K$, and indicates p+1 operations is needed. This verifies the effectiveness of approximating the number of user interactions with subset-saliency entropy H(Q) 520.

Exemplary Method

Figure 7:
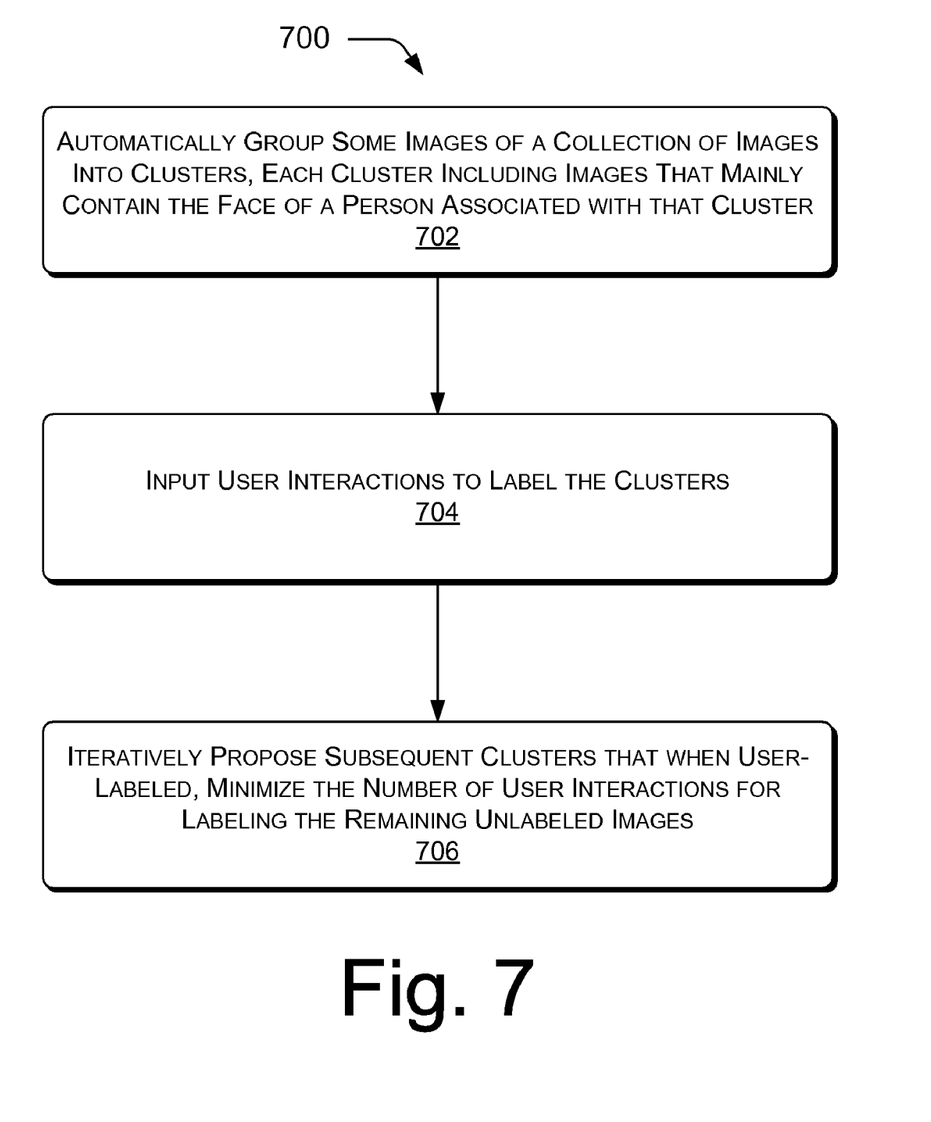
FIG. 7 is a flow diagram of a method of semi-automatically performing face annotation of a collection of digital images, such that the number of user interactions to label the entire collection is minimized.

FIG. 7 shows an exemplary method 700 of semi-automatically performing face annotation of a collection of digital images, such that the number of user interactions to label the entire collection is minimized. In the flow diagram, the operations are summarized in individual blocks. The exemplary method 700 may be performed by hardware, software, or combinations of hardware, software, firmware, etc., for example, by components of the exemplary face annotation engine 108.

At block 702, some images of a collection of images are automatically grouped into clusters, each cluster mainly including images that contain a single person's face associated with that cluster. The automatic grouping into clusters includes detecting and aligning faces, and deriving contextual features from each image, including facial features, clothing features, and temporal features.

In one implementation, a Bayesian combination of the contextual features results in a similarity matrix containing similarity pairs. The similarity pairs are spectrally embedded in a compact manifold, modeled as mixtures of Gaussian distributions. Then, by applying an iterative expectation-maximization technique, the difference between probability densities in the compact manifold makes evident the clusters of images having the same person's face.

At block 704, user interactions are input to label the clusters and if necessary, to delete images that do not belong—i.e., images of a different person erroneously included in the cluster. This initial labeling on the user's part provides the later efficient interactive labeling step a starting point that already contains a great deal of information that can be exploited to minimize the total number of user interactions for labeling the entire collection of images.

At block 706, subsequent clusters are iteratively proposed, such that when the subsequent clusters are user-labeled, the information efficiency in the system is maximized at each iteration. In one implementation, information efficiency, e.g., defined in Equation (10), is the ratio of expected information gain to estimated user operations in labeling unlabeled faces. Therefore maximizing information efficiency is equivalent to simultaneously maximizing expected information gain while minimizing the estimated number of user operations.

In one implementation, the information gain to the system is modeled as a global system entropy, while the minimization of the number of user interactions is modeled by a subset-saliency entropy. As the method 700 iteratively progresses, the amount of information learned from the user interactions at each iteration cascades, resulting in a quick annotation of the faces in the entire collection with minimal user interaction.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
identifying clusters of images in a collection of images with a deliberate bias toward finding evident clusters instead of trying to force every image in the collection into a cluster, each cluster including images of a face of a person characterizing the cluster, the evident clusters having a uniform background distribution for noisy data;
accepting a user interaction to label each cluster;
iteratively formulating proposed clusters from remaining images in the collection to solicit subsequent user interactions for labeling images in each proposed cluster, each iteration of the formulating proposing a cluster such that the subsequent user interactions maximize an information efficiency for subsequently labeling the remaining images in the collection while using a minimum number of user interactions.

2. The method as recited in claim 1, wherein identifying clusters comprises including an image in a cluster when a face in the image is identified with a high degree of certainty as the face of the person common to other images in the cluster; and
  wherein images that contain faces that are not identified with a high degree of certainty remain unclustered in the collection of images.

3. The method as recited in claim 1, wherein the iteratively formulating proposed clusters maximizes an information efficiency for formulating subsequent proposed clusters using a minimum number of user operations.

4. The method as recited in claim 1, wherein iteratively formulating proposed clusters includes selecting a group of images for each cluster to solicit a user interaction for maximizing the information gain based on a global system entropy.

5. The method as recited in claim 1, wherein maximizing the information efficiency is based on a global system entropy.

6. The method as recited in claim 1, wherein iteratively formulating proposed clusters includes selecting a group of images for each cluster to solicit a user interaction for minimizing the subsequent user interactions for labeling the remaining images in the collection.

7. The method as recited in claim 6, wherein minimizing subsequent user interactions is based on a subset-saliency entropy.

8. The method as recited in claim 1, wherein identifying clusters of images in a collection of images includes the automatic steps of:
  detecting and aligning faces;
  deriving features associated with each image, including facial features, clothing features, and temporal features;
  deriving a Bayesian combination of the features into a similarity matrix containing similarity pairs;
  spectrally embedding the similarity pairs in a compact manifold; and
  applying an iterative expectation-maximization technique to discern images belonging to one of the clusters.

9. The method as recited in claim 8, wherein the deriving a Bayesian combination includes calculating facial feature distances, clothing feature distances, and time feature distances;
  wherein calculating the feature distances uses a time prior such that a face of a person is associated with the same clothing features during short intervals; and
  wherein calculating the feature distances uses a cannot-link prior such that a face of a person appears only once in a single image.

10. The method as recited in claim 8, further comprising replacing a K-means component of spectral clustering with partial clustering such that only evident clusters emerge.

11. The method as recited in claim 10, wherein the similarity pairs are modeled as a mixture of Gaussian distributions in the compact manifold, wherein the mixture includes a uniform background noise distribution and an exponential prior to control variances of each component Gaussian distribution in the mixture.

12. The method as recited in claim 10, further comprising using an iterative Expectation-Maximization (EM) technique to derive evident clusters.

13. The method as recited in claim 12, wherein the iterative EM technique solves a Maximum a Posteriori (MAP) estimation of a posterior likelihood function.

14. A system, comprising:
  a storage device for storing a collection of digital images;
  a face annotation engine to label the digital images using a minimal number of user interactions;
  a partial clustering engine in the face annotation engine to automatically cluster some of the digital images into evident clusters instead of forcing every image in the collection into a cluster, each evident cluster containing images that include a face of a single person, and the evident clusters having a uniform background distribution for noisy data; and
  an efficient labeling engine in the face annotation engine to iteratively propose clusters of unlabeled images such that user interactions to label the proposed clusters maximize labeling of the digital images and achieve the minimal number of user interactions.

15. The system as recited in claim 14, further comprising:
  a feature extractor in the partial clustering engine to derive multiple features, including facial features, clothing features, and temporal features of each image; and
  a Bayesian face similarity comparator to combine the multiple features into a similarity matrix containing similarity pairs.

16. The system as recited in claim 15, further comprising a spectral partial clustering module to concentrate similarity pair data based on a mixture of Gaussian distributions, wherein a Gaussian mixture model contains a uniform background noise distribution and an exponential prior to control the variances of each component Gaussian distribution.

17. The system as recited in claim 16, further comprising an expectation-maximization engine in the partial clustering engine to iteratively solve a Maximum a Posteriori (MAP) estimation of a posterior likelihood to discern images belonging to each of the evident clusters.

18. The system as recited in claim 14, wherein the efficient labeling engine further includes an information efficiency optimizer to maximize an information gain for automatically labeling unlabeled images in the collection of digital images while minimizing the number of user interactions to label the unlabeled images.

19. The system as recited in claim 18, wherein the information efficiency optimizer includes:
  an information gain model based on global system entropy; and
  a user interactions decrease model based on a subset-saliency entropy.

20. A method performed by a computing device, the method comprising:
  automatically grouping some images of a collection of images into clusters, the grouping comprising:
  using spectral embedding to find representation of face of an image in a plurality of feature spaces, the plurality of feature spaces including a facial feature space representing a face of the image, a clothing feature space representing clothing features in association with the face of the image, and a time feature space representing a time when the image was taken; and
  partially clustering the collection of images into clusters with a deliberate bias toward finding evident clusters, each evident cluster including images that reliably contain a face of a person associated with that cluster, the evident clusters having a uniform background distribution for noisy data;
  labeling the clusters; and
  iteratively proposing subsequent clusters that when user-labeled, minimize the number of user interactions for labeling the remaining unlabeled images based on global system entropy and subset-saliency entropy.

* * * * *